(12) United States Patent
Mashio et al.

(10) Patent No.: US 9,950,747 B2
(45) Date of Patent: Apr. 24, 2018

(54) VEHICLE BODY COMPONENT

(71) Applicant: AISIN TAKAOKA CO., LTD., Aichi (JP)

(72) Inventors: Shunji Mashio, Aichi (JP); Yuki Ishiguro, Aichi (JP)

(73) Assignee: AISIN TAKAOKA CO., LTD. (JP)

( * ) Notice: Subject to any disclaimer, the term of this patent is extended or adjusted under 35 U.S.C. 154(b) by 0 days.

(21) Appl. No.: 15/317,900

(22) PCT Filed: May 28, 2015

(86) PCT No.: PCT/JP2015/065398
§ 371 (c)(1),
(2) Date: Dec. 9, 2016

(87) PCT Pub. No.: WO2015/190303
PCT Pub. Date: Dec. 17, 2015

(65) Prior Publication Data
US 2017/0106917 A1    Apr. 20, 2017

(30) Foreign Application Priority Data

Jun. 13, 2014   (JP) ................. 2014-122164

(51) Int. Cl.
| | |
|---|---|
| *B60R 19/04* | (2006.01) |
| *B62D 27/02* | (2006.01) |
| *B62D 21/10* | (2006.01) |
| *B62D 21/15* | (2006.01) |
| *B62D 25/06* | (2006.01) |
| *B62D 25/02* | (2006.01) |
| *B60R 19/02* | (2006.01) |

(52) U.S. Cl.
CPC .......... *B62D 27/023* (2013.01); *B60R 19/023* (2013.01); *B62D 21/10* (2013.01);
(Continued)

(58) Field of Classification Search
CPC .. B62D 27/023; B62D 25/025; B62D 21/157; B62D 21/10; B62D 25/06; B60R 19/023
(Continued)

(56) References Cited

U.S. PATENT DOCUMENTS

| | | | |
|---|---|---|---|
| 6,099,194 A * | 8/2000 | Durand ................. | B62D 21/02 296/204 |
| 6,733,040 B1 * | 5/2004 | Simboli ................ | B62D 21/02 280/784 |

(Continued)

FOREIGN PATENT DOCUMENTS

| | | |
|---|---|---|
| EP | 1923577 A1 | 5/2008 |
| EP | 2336004 A1 | 6/2011 |

(Continued)

OTHER PUBLICATIONS

Notice of Second Office Action; The State Intellectual Property Of The People's Republic Of China; dated Jan. 3, 2018.

*Primary Examiner* — Jason S Morrow
*Assistant Examiner* — E Turner Hicks
(74) *Attorney, Agent, or Firm* — AEON Law, PLLC; Adam L. K. Philipp; David V. H. Cohen

(57) ABSTRACT

The purpose of the present invention is to obtain a vehicle body component such that problems relating to conventionally proposed technology can be solved, thereby preventing increases in the number of components or manufacturing steps for reinforcement, for example. A bumper reinforce (10) includes a first component (11) and a second component (21) that are formed from channel steel with approximately U-shaped lateral cross section, and is configured by connecting the ends of the components (11, 21). Connecting portions (13, 23) of the first component (11) and the second component (21) respectively have slits (31, 41) along a direction in which the components (11, 21) are arranged. The components (11, 21) are connected with the components (11, 21) overlapping each other in a staggered manner on both upper and lower sides across the slits (31, 41).

9 Claims, 18 Drawing Sheets

(52) U.S. Cl.
CPC ......... *B62D 21/157* (2013.01); *B62D 25/025* (2013.01); *B62D 25/06* (2013.01)

(58) Field of Classification Search
USPC .......................... 296/29, 30, 203.01, 193.01
See application file for complete search history.

(56) References Cited

U.S. PATENT DOCUMENTS

| | | | |
|---|---|---|---|
| 7,048,326 B2 | 5/2006 | Yasui | |
| 8,424,912 B2 * | 4/2013 | Favaretto | B62D 21/12 |
| | | | 280/781 |
| 9,487,244 B2 * | 11/2016 | Elfwing | B23K 11/11 |
| 2001/0038231 A1 * | 11/2001 | Takemoto | B60R 19/34 |
| | | | 296/187.09 |
| 2013/0300097 A1 * | 11/2013 | Garceau | B62D 21/02 |
| | | | 280/789 |
| 2015/0102614 A1 * | 4/2015 | Arns | B60R 19/023 |
| | | | 293/102 |

FOREIGN PATENT DOCUMENTS

| | | |
|---|---|---|
| JP | S56-165104 U | 12/1981 |
| JP | H10138960 A | 5/1998 |
| JP | 2005-112171 A | 4/2005 |
| JP | 2010-132063 A | 6/2010 |
| JP | 2010-215125 A | 9/2010 |

\* cited by examiner

VEHICLE BODY COMPONENT

TECHNICAL FIELD

The present invention relates to a vehicle body component in a vehicle such as an automobile.

BACKGROUND ART

A vehicle such as an automobile uses vehicle body components to configure a vehicle body, such as frame components and reinforcing components (see Patent Document 1). The frame components form the frame of a vehicle body, and the reinforcing components reinforce the strength of the frame in order to stabilize the operation of the vehicle and to restrain vibrations, noise, and deformation in a collision of the vehicle.

Among the vehicle body components, even the same component varies greatly in size depending on models and sizes of vehicles. The vehicle body components include many components having relatively long lengths. In the case of such relatively long vehicle body components, in view of facilitation of manufacture, as shown in FIG. 17, it has been proposed to divide a vehicle body component 120 into a plurality of components along its longitudinal direction and to connect the plurality of components to configure the vehicle body component 120. In the illustrated state, a first component 121 and a second component 122 are connected to configure the single vehicle body component 120.

In connecting the first component 121 and the second component 122, generally, end portions of the two components 121 and 122 are butted against each other; then, the butt portion is welded. However, mere welding fails to secure sufficient strength of the welded joint. Thus, it has been proposed to provide a reinforcing member 123 at the butt portion between the two components 121 and 122 for securing the strength of the welded joint.

PRIOR ART DOCUMENT

Patent Document

Patent Document 1: Japanese Patent Application Laid-Open (kokai) No. 2005-112171

SUMMARY OF THE INVENTION

Problem to be Solved by the Invention

However, in the above-mentioned connecting structure in which the end portions of the components 121 and 122 are butted against each other and welded, welding requires large-scale positioning jigs in order to hold the end portions of the components in a butted condition. Also, since the reinforcing member 123 is additionally required for securing strength, various problems arise; for example, the number of components increases, and a step for attaching the reinforcing member is required, thereby increasing the number of manufacturing steps.

An object of the present invention is to provide a vehicle body component capable of solving problems involved in conventionally proposed techniques to thereby prevent increases in the number of components and manufacturing steps associated with reinforcement.

Means for Solving the Problem

In order to solve the above problem, a first invention provides a vehicle body component comprising a first component and a second component which are formed of a plate material, and configured to extend in a juxtaposition direction in which the components are arranged, by connecting end portions of the components, wherein the connection-side end portion of the first component has a slit which opens at its end and that the connection-side end portion of the first component and the connection-side end portion of the second component overlap each other in a staggered manner on opposite sides across the slit.

According to the first invention, since, at a connection between the first component and the second component which constitute the vehicle body component, the second component overlaps the first component from inside and outside in a staggered manner, the plate material is duplicated. By virtue of such duplication, strength at the connection is secured, thereby eliminating a need to attach an additional reinforcing member for securing strength. As a result, there can be suppressed an increase in the number of components for reinforcing strength and an addition of a step for attaching the reinforcing member.

Also, in contrast to a conventional technique in which end surfaces merely butt against each other and a conventional technique in which plate portions merely overlap each other, since a connected condition is maintained unless force acts in such a direction as to separate the two components, stability of the connection can be secured. Thus, welding or a screw clamp, for example, for fixing the connected condition of the two components is not mandatory, whereby an increase in manufacturing steps and an increase in manufacturing costs can be suppressed. Even if welding or a screw clamp, for example, is to be performed on the connection of the two components, a large-scale jig is unnecessary for holding a connected condition of the two components, whereby an increase in manufacturing steps and an increase in manufacturing costs can be suppressed.

A second invention is characterized in that, in the first invention, one side of the opposite sides across the slit is retracted inward in the connection-side end portion of the first component and a step is provided between the one side and the other side across the slit.

According to the second invention, by virtue of provision of the step between the opposite sides across the slit, the two components can be connected by inserting the second component between plate portions located on the opposite sides across the slit; therefore, the connecting work for the two components is facilitated.

A third invention is characterized in that, in the first invention, the slit extends in the juxtaposition direction.

According to the third invention, since the slit is provided along the juxtaposition direction, the two components can be connected while being moved along the juxtaposition direction. This also facilitates the connecting work for the two components.

A fourth invention is characterized in that, in the third invention, the connection-side end portion of the second component has a slit which opens at its end and extends along the juxtaposition direction; the slit overlaps the slit of the first component; and the side which is retracted inward is the opposite to the first component and a step is provided between the side and the other side across the slit of the second component.

According to the fourth invention, not only the first component, but also the second component has the slit along the juxtaposition direction, as well as the step provided between the opposite sides across the slit. Thus, through utilization of the steps of the two components which are opposite in direction to each other, the two components can be connected while being moved along the juxtaposition direction with the slits joining each other. By virtue of this, the workability of the connecting work for the two components can be further improved.

A fifth invention is characterized in that, in the fourth invention, the first component and the second component have the same plate thickness, and the dimension of the steps are substantially equal to the plate thickness.

According to the fifth invention, since the steps are equal to the plate thickness of the first component and the second component, in a state in which the two components overlap each other in a staggered manner, the two components can be in surface contact with each other. Thus, as compared with the case where a gap is formed between the two components, force imposed on one component can be surface-supported by the other component, whereby the degree of strength reinforcement can be improved.

A sixth invention is characterized in that, in the fourth invention, the slits provided in the first component and the second component are provided at respective central portions with respect to a direction substantially orthogonal to the juxtaposition direction.

According to the sixth invention, the second component also has the slit and the step, and the slit is positioned at the central portion with respect to a direction substantially orthogonal to the juxtaposition direction; therefore, the connection-side end portion of the first component becomes that of the second component by inverting the first component. Thus, if, in addition to the connection-side end portion, other portions of the first component are designed to become those of the second component by inversion, the first component and the second component can be common components. This eliminates the need to separately manufacture the first component and the second component, thereby contributing to a reduction in manufacturing costs.

A seventh invention is characterized in that, in the fourth invention, in each of the connection-side end portions of the first component and the second component, one of plate portions located on the opposite sides across the slit is taken as a first flat plate portion flush with a plate portion, and the other plate portion is taken as a second flat plate portion which forms the step in cooperation with the first flat plate portion as a result of subjection to bending while being held in parallel with the first flat plate portion.

According to the seventh invention, the first flat plate portion flush with the plate portion of each of the components and the second flat plate portion formed through subjection to bending exist on the opposite sides across the slit, and the two flat plate portions form the step. In this case, the second flat plate portion can be readily formed by press working. Also, by connecting the first component and the second component in such a manner that the second flat plate portion of one component overlaps the first flat plate portion of the other component, the first flat plate portions of the two components form the same plane. Thus, the generation of irregularities at the connection can be suppressed.

An eighth invention is characterized in that, in the seventh invention, the second flat plate portion of the first component and the second flat plate portion of the second component are in contact with each other at their edges.

According to the eighth invention, since the second flat plate portion of the first component and the second flat portion of the second component are in contact with each other at their edges, in connecting the two components, connection proceeds while the edges are in contact with each other. In connecting the two components by moving them in their juxtaposition direction, the contact between the edges functions as guide for the connecting work, thereby facilitating the connecting work.

A ninth invention is characterized in that, in the seventh invention, each of the first component and the second component has a channel-shaped cross section and has a bottom plate portion extending along a direction substantially orthogonal to the juxtaposition direction and a pair of side plate portions extending sideward from opposite ends in the substantially orthogonal direction of the bottom plate portion; in each of the connection-side end portions of the first component and the second component, the slit, the first flat plate portion, and the second flat plate portion are provided at the bottom plate portion; and of a pair of the side plate portions, the side plate portion connected to the second flat plate portion is subjected to bending in such a manner as to be disposed at a position shifted toward the other side plate portion.

According to the ninth invention, in connecting the first component and the second component, the second flat plate portion and the side plate portion connected to the second flat plate portion are inserted inside the first flat plate portion and the side plate portion connected to the first flat plate portion. In this case, if the first component and the second component have a channel shape, the two components overlap each other in a staggered manner at the bottom plate portions, and the side plate portions also overlap each other. Thus, the connection between the two components is duplicated, thereby securing strength and stably maintaining a connected condition.

BRIEF DESCRIPTION OF THE DRAWINGS

FIG. 4 is a set of sectional views of connecting portions, wherein

FIG. 6 is a set of perspective views showing the state of connecting the first component and the second component, wherein

MODES FOR CARRYING OUT THE INVENTION

An embodiment of the present invention will next be described with reference to the drawings. The present embodiment is an example of application of the present invention to a bumper reinforce, which is a frame component in a vehicle such as an automobile.

Figure 1:
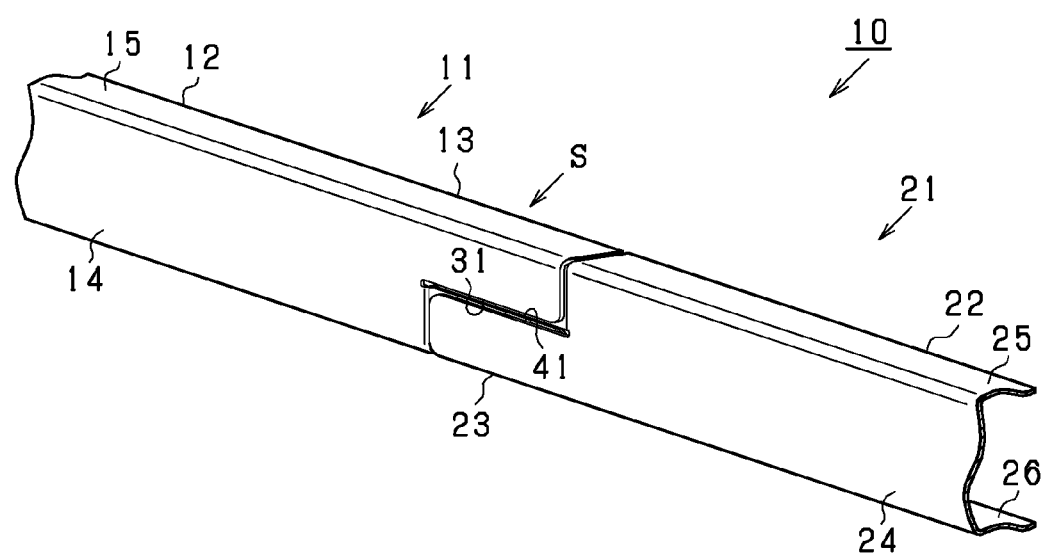
FIG. 1 is a perspective view showing a portion of a bumper reinforce of an embodiment.

FIG. 1 is a perspective view showing a portion of a bumper reinforce 10. An overall picture of the bumper reinforce 10 will be described with reference to FIG. 1. The bumper reinforce 10 is an elongated vehicle body component, and FIG. 1 shows a portion of the bumper reinforce 10, centering on a longitudinally central portion thereof. At the longitudinally central portion shown in FIG. 1, the bumper reinforce 10 has a rectilinear shape. The actual bumper reinforce 10 further extends in the longitudinal direction from the opposite ends of the bumper reinforce 10 shown in FIG. 1.

As shown in FIG. 1, the bumper reinforce 10 is composed of two components; specifically, a first component 11 and a second component 21. Each of the first component 11 and the second component 21 has an elongated shape. The two components 11 and 21 are connected at their longitudinal end portions to thereby configure the single bumper reinforce 10. In the bumper reinforce 10, a connection S between the first component 11 and the second component 21 exists at a longitudinally central portion of the bumper reinforce 10.

The first component 11 and the second component 21 used to form the bumper reinforce 10 have respective body portions 12 and 22, and respective connecting portions 13 and 23 for connection to the counter components. Each of the two components 11 and 21 has an elongated shape and is formed of a channel steel having a U-shaped cross section. The channel shapes of the two components 11 and 21 have the same dimensions.

The body portion 12 of the first component 11 has a web 14 which serves as a bottom plate portion, and flanges 15 and 16 which serve as a pair of side plate portions, extend sideward from the opposite ends of the web 14, and face each other with the web 14 intervening therebetween. In FIG. 1, the lower flange 16 is hidden. The connecting portion 13 is provided at an end portion of the body portion 12 to be connected to the second component 21 and constitutes the connection S in cooperation with the connecting portion 23 of the second component 21.

Similar to the body portion 12 of the first component 11, the body portion 22 of the second component 21 has a web 24 which serves as a bottom plate portion, and flanges 25 and 26 which serve as a pair of side plate portions. The connecting portion 23 of the second component 21 is provided at an end portion of the body portion 22 to be connected to the first component 11 and constitutes the connection S in cooperation with the connecting portion 13 of the first component 11.

Figure 2:
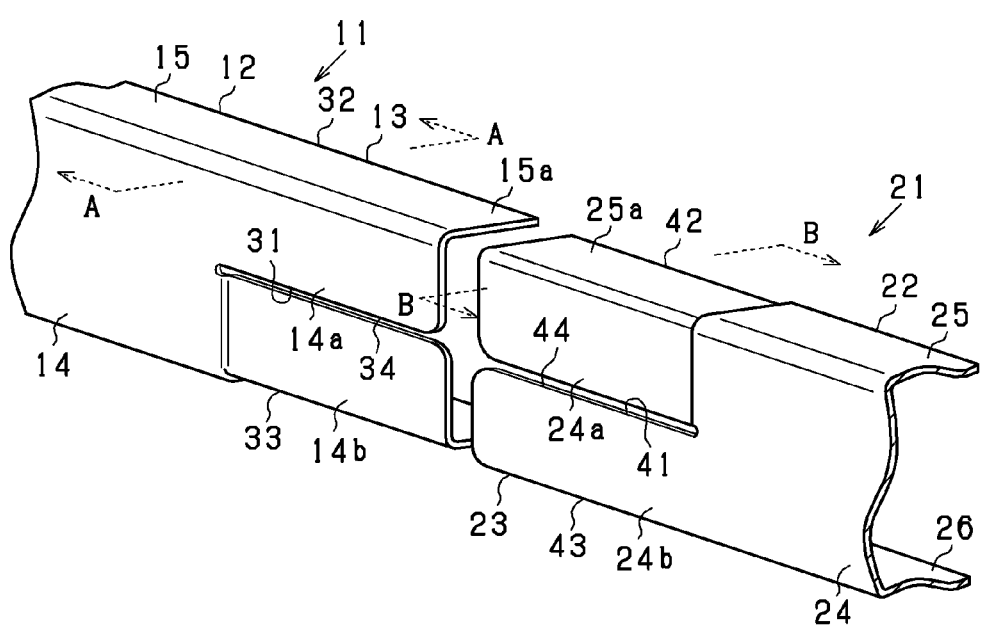
FIG. 2 is an exploded perspective view showing a first component and a second component.

Next, the structures of the connecting portions 13 and 23 of the first component 11 and the second component 21 will be described in detail with reference to FIGS. 2 to 4. FIG. 2 is an exploded perspective view of the first component 11 and the second component 21, showing the structures of the connecting portions 13 and 23 of the components 11 and 21.

Figure 3:
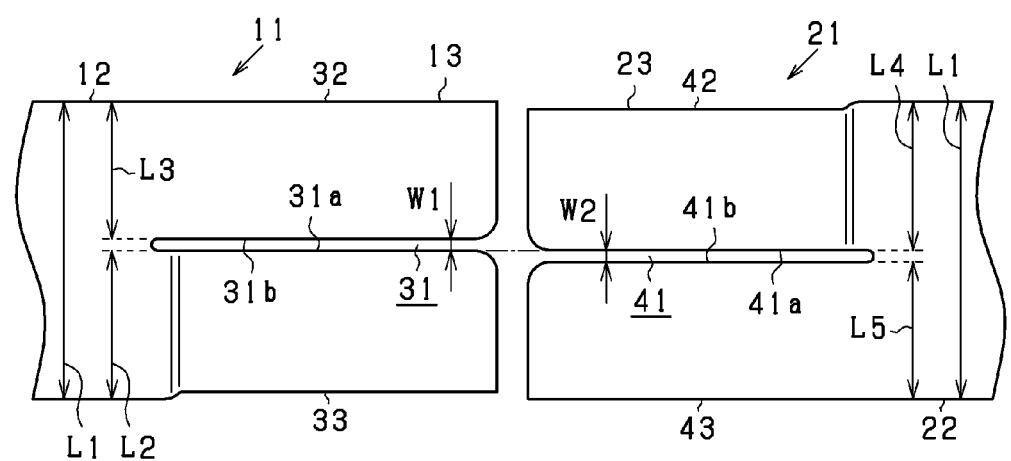
FIG. 3 is a front view of FIG. 2.
Figure 4A:
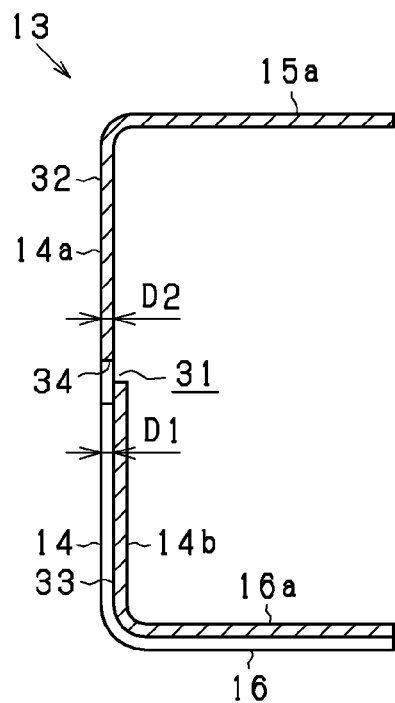
FIG. 4A shows a section (A-A section of FIG. 2) of the connecting portion of the first component.
Figure 4B:
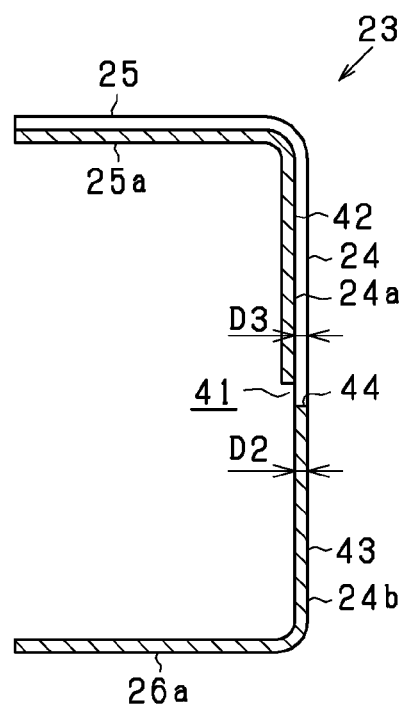
FIG. 4B shows a section (B-B section of FIG. 2) of the connecting portion of the second component.

FIG. 3 is a front view of FIG. 2. FIG. 4 is a set of sectional views of the connecting portions 13 and 23, wherein FIG. 4A shows a section (A-A section of FIG. 2) of the connecting portion 13 of the first component 11, and FIG. 4B shows a section (B-B section of FIG. 2) of the connecting portion 23 of the second component 21.

For convenience of explanation, the following description uses the vertical, horizontal, and depth directions specified on the basis of a state illustrated in FIG. 2. The horizontal direction corresponds to the juxtaposition direction of the first component 11 and the second component 21, and the vertical direction corresponds to a direction substantially orthogonal to the juxtaposition direction.

As shown in FIG. 2, the connection-side end portion of the first component 11 has a slit 31 which is formed in the web 14 along the longitudinal direction (the horizontal direction) and opens at the end of the web 14. The slit 31 divides the web 14 into two portions located in a direction (the vertical direction) orthogonal to the aforementioned longitudinal direction of the web 14. The slit 31 is provided at a substantially central portion with respect to the vertical direction. The connection-side end portion of the first component 11 which is divided by the slit 31 is the connecting portion 13.

As shown in FIG. 3, the slit 31 is provided at a substantially central portion with respect to the vertical direction. Of two vertically disposed edges which define the slit 31, a lower edge 31a is located substantially at the center of a vertical width L1 of the body portion 12. That is, a length L2 from the lower end of the body portion 12 to the lower edge 31a of the slit 31 is half of the vertical width L1 of the body portion 12. An upper edge 31b which partially defines the slit 31 is located above the center of the vertical width L1 of the body portion 12. That is, a length L3 from the upper end of the body portion 12 to the upper edge 31b of the slit 31 is shorter than half of the vertical width L1 of the body portion 12.

Referring back to FIG. 2, description will continue. As a result of the web 14 being divided into two vertically disposed portions as mentioned above, the connecting portion 13 has an upper connecting portion 32 located above the slit 31 and a lower connecting portion 33 located below the slit 31. The upper connecting portion 32 is formed into a shape resembling the letter L by an upper web 14a located above the slit 31, and an upper flange 15a. The lower connecting portion 33 is formed into a shape resembling the letter L by a lower web 14b located below the slit 31 and a lower flange 16a (see FIG. 4A).

The upper web 14a and the upper flange 15a of the upper connecting portion 32 extend intactly from and thus are flush with the web 14 and the upper flange 15, respectively, of the body portion 12. By contrast, the lower web 14b and the lower flange 16a of the lower connecting portion 33 are retracted inward in relation to the web 14 and the flange 16, respectively, of the body portion 12 while being held in parallel with the web 14 and the flange 16, respectively. Thus, the lower flange 16a is disposed at a position shifted toward the upper flange 15a.

As a result of the retraction, as shown in FIG. 4, a step 34 is formed between the upper connecting portion 32 and the lower connecting portion 33. A dimension D1 (i.e., the amount of retraction) of the step 34 is substantially equal to a plate thickness D2. Notably, the upper web 14a corresponds to the first flat plate portion, and the lower web 14b corresponds to the second flat plate portion.

The lower connecting portion 33 is formed in the following manner. The slit 31 is formed along the horizontal direction in the connection-side end portion of the body portion 12. An appropriate method such as press working or laser machining can be employed for the formation. Next, with a side opposite an open end portion of the slit 31 serving as a proximal end side, by an appropriate method such as press working, while the proximal end portion is being bent to a substantially hook-like shape, the lower web 14b and the lower flange 16a are retracted inward. As a result, the lower connecting portion 33 retracts inward in relation to the upper connecting portion 32, whereby the step 34 is formed between the upper connecting portion 32 and the lower connecting portion 33 in the plate thickness direction.

Next, the connecting portion 23 of the second component 21 will be described. Structural features similar to those of the connecting portion 13 of the first component 11 will be described briefly.

As shown in FIG. 2, in the connection-side end portion of the second component 21 also, a slit 41 is formed along the horizontal direction of the body portion 22 at a substantially central portion of the web 24 with respect to the vertical direction, thereby dividing the web 24 into two vertically disposed portions. The horizontal length of the slit 41 is equal to that of the slit 31 of the first component 11. The connection-side end portion of the second component 21 which is divided by the slit 41 is the connecting portion 23.

As shown in FIG. 3, the slit 41 is provided at a substantially central portion with respect to the vertical direction. Of two vertically disposed edges which define the slit 41, an upper edge 41a is located substantially at the center of the vertical width L1 of the body portion 22. That is, a length L4 from the upper end of the body portion 22 to the upper edge 41a of the slit 41 is half of the vertical width L1 of the body portion 22. A lower edge 41b which partially defines the slit 41 is located below the center of the vertical width L1 of the body portion 22. That is, a length L5 from the lower end of the body portion 22 to the lower edge 41b of the slit 41 is shorter than half of the vertical width L1 of the body portion 22. Notably, a slit width W2 of the slit 41 of the second component 21 is equal to a slit width W1 of the slit 31 of the first component 11.

Referring back to FIG. 2, as a result of the web 24 being divided into two vertically disposed portions, the connecting portion 23 has an upper connecting portion 42 located above the slit 41 and a lower connecting portion 43 located below the slit 41. The upper connecting portion 42 is formed into a shape resembling the letter L by an upper web 24a located above the slit 41, and an upper flange 25a. The lower connecting portion 43 is formed into a shape resembling the letter L by a lower web 24b located below the slit 41 and a lower flange 26a (see FIG. 4B).

The upper connecting portion 42 and the lower connecting portion 43 of the second component 21 are vertically reverse to the upper connecting portion 32 and the lower connecting portion 33 of the first component 11 with respect to an inwardly retracted portion. That is, while the upper connecting portion 42 retracts inward, the lower connecting portion 43 is such that the body portion 22 extends intactly.

Thus, the upper web 24b and the upper flange 25a of the upper connecting portion 42 are retracted inward in relation to the web 24 and the flange 25, respectively, of the body portion 22 while being held in parallel with the web 24 and the flange 25, respectively. Thus, the upper flange 25a is disposed at a position shifted toward the lower flange 26a. The lower web 24b and the lower flange 26a of the lower connecting portion 43 are flush with the web 24 and the upper flange 26, respectively, of the body portion 22.

As a result of the retraction of the upper connecting portion 42, as shown in FIG. 4, a step 44 is formed between the upper connecting portion 42 and the lower connecting portion 43 in the plate thickness direction. The step 44 is opposite in direction to the step 34 of the first component 11, and a dimension D3 (i.e., the amount of retraction) of the step 44 is substantially equal to the plate thickness D2. Notably, the upper web 24a corresponds to the second flat plate portion, and the lower web 24b corresponds to the first flat plate portion.

The upper connecting portion 42 also is formed by a method similar to that for forming the lower connecting portion 33 of the first component 11. Specifically, after the slit 41 is formed in the web 24, while a proximal end portion is being bent to a substantially hook-like shape, the upper web 24a and the upper flange 25a are retracted inward. As a result, the upper connecting portion 42 retracts inward in relation to the lower connecting portion 43, whereby the step 44 is formed between the upper connecting portion 42 and the lower connecting portion 43.

Here, the dimensions of the first component 11 and the second component 21 will be reconfirmed.

First, the body portions 12 and 22 have the same shape and dimensions (see FIGS. 2 and 3). Also, the slits 31 and 41 formed in the connecting portions 13 and 23, respectively, have the same length, and the slit widths W1 and W2 are equal to each other (see FIG. 3). Further, the dimensions (the amounts of retraction) D1 and D3 of the steps 34 and 44 of the connecting portions 13 and 23, respectively, are equal to each other (see FIG. 4).

Additionally, the length L2 from the lower end of the body portion 12 to the lower edge 31a of the slit 31 in the connecting portion 13 of the first component 11 and the length L4 from the upper end of the body portion 22 to the upper edge 41a of the slit 41 are substantially equal to each other. That is, the length L2 and the length L4 are substantially half of the vertical width L1 of the body portions 12 and 22. Thus, as shown in FIG. 3, if the first component 11 and the second component 21 are disposed at the vertically same position, the lower edge 31a of the slit 31 of the first component 11 and the upper edge 41a of the slit 41 of the second component 21 are disposed on substantially the same straight line.

Figure 5:
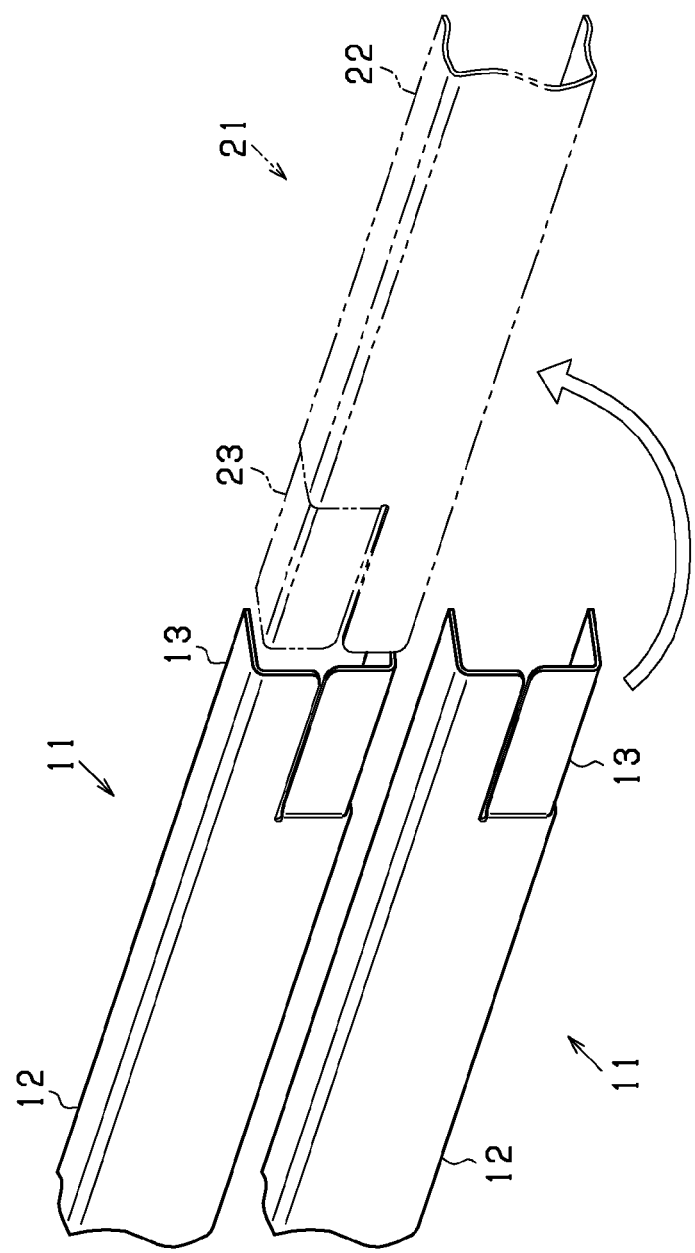
FIG. 5 is a perspective view showing that the first member becomes the second member by reversing the first member.

Thus, in the case of the first component 11 and the second component 21 of the present embodiment, by reversing the first component 11 by 180 degrees, the first component 11 has the configuration of the second component 21. FIG. 5 is a perspective view showing the reversing action in which the first component 11 is reversed to become the second component 21. Thus, there is no need to manufacture the second component 21 separately from the first component 11; i.e., at the same time that the first component 11 is manufactured, the second component 21 is manufactured.

The bumper reinforce 10 is symmetrical in a front view such that longitudinally right and left sides thereof are in a mirror image relation. The above description does not cover end portions of the body portions 12 and 22 opposite the connecting portions 13 and 23; however, since the bumper reinforce 10 has such a bilaterally symmetrical configuration, by reversing the first component 11, the first component 11 becomes the second component 21.

Figure 6A:
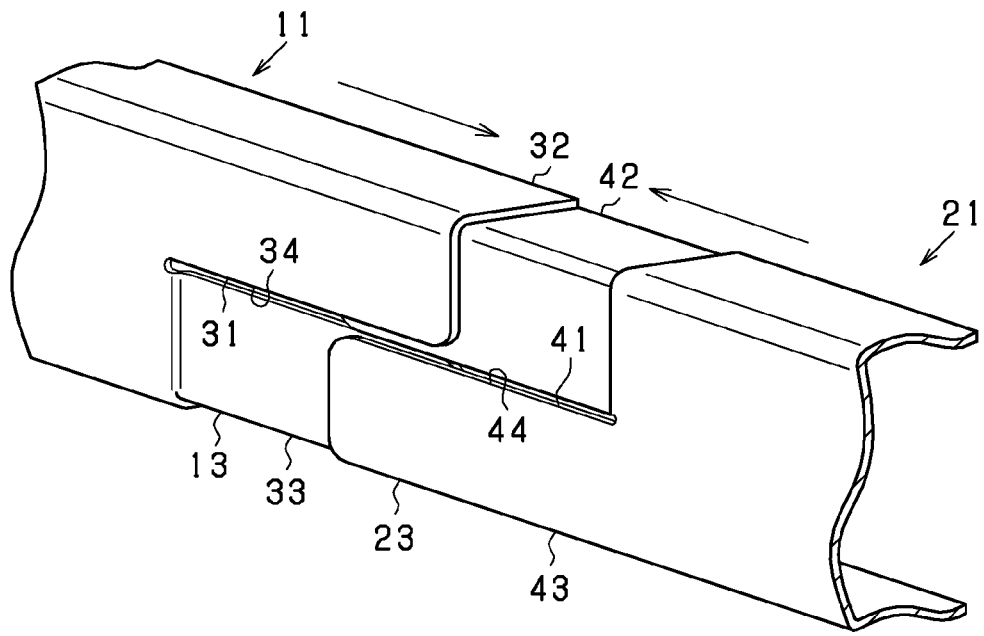
FIG. 6A shows the state of connection under way.
Figure 6B:
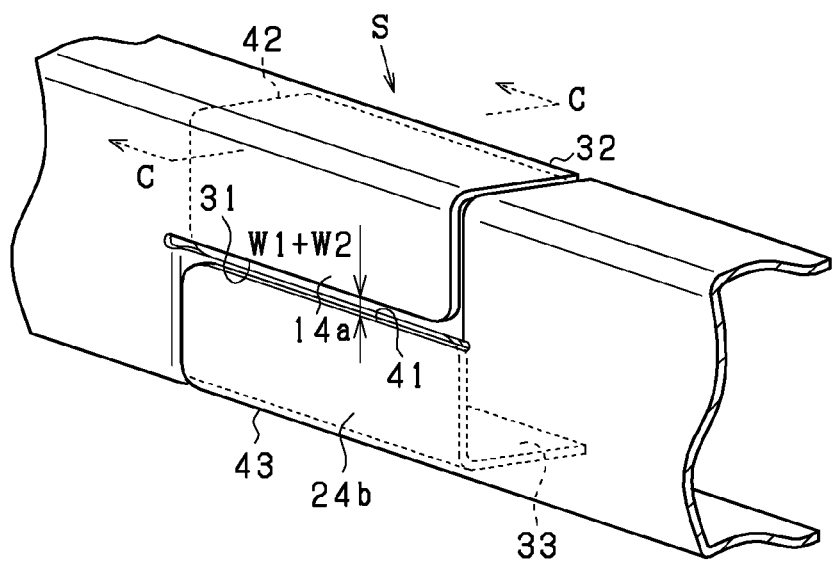
FIG. 6B shows the state of completed connection.
Figure 7:
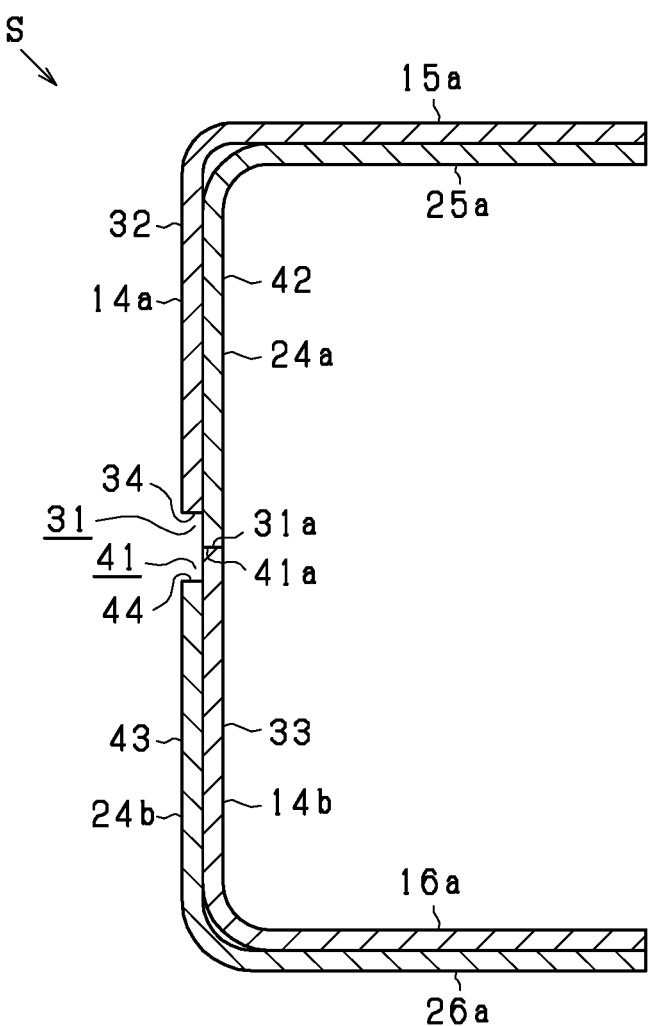
FIG. 7 is a sectional view taken along line C-C of FIG. 6B.

Next, a method of connecting the first component 11 and the second component 21 will be described with reference to FIGS. 6 and 7. FIG. 6 is a set of perspective views showing the state of connecting the first component 11 and the second component 21, wherein FIG. 6A shows the state of connection under way, and FIG. 6B shows the state of completed connection. FIG. 7 is a sectional view taken along line C-C of FIG. 6B.

The first component 11 and the second component 21 are connected as follows. First, as shown in FIG. 2, the first component 11 and the second component 21 are brought into a state in which their connecting portions 13 and 23 which are longitudinally aligned with each other and whose channel shapes have the same orientation face each other.

The first component 11 and the second component 21 are slid for coupling such that the upper connecting portion 42 of the second component 21 is inserted inside the upper connecting portion 32 of the first component 11 and such that the lower connecting portion 33 of the first component 11 is inserted inside the lower connecting portion 43 of the second component 21. Thus, as shown in FIG. 6A, connecting the first component 11 and the second component 21 proceeds such that the upper connecting portion 42 of the second component 21 overlaps the upper connecting portion 32 of the first component 11 from inside and such that the lower connecting portion 43 of the second component 21 overlaps the lower connecting portion 33 of the first component 11 from outside. At this time, the slits 31 and 41 of the two components 11 and 21 are in a joined state.

In this case, as mentioned above, the first component 11 and the second component 21 have the same plate thickness D2, and the portions to be inserted (the upper connecting portion 42 of the second component 21 and the lower connecting portion 33 of the first component 11) are retracted by a dimension equal to the plate thickness D2 (see FIG. 4). Thus, as shown in FIG. 7, the upper connecting portion 32 of the first component 11 and the upper connecting portion 42 of the second component 21 overlap each other in a surface contact manner, and the lower connecting portion 43 of the second component 21 and the lower connecting portion 33 of the first component 11 overlap each other in a surface contact manner.

Also, the lower edge 31a of the slit 31 of the first component 11 and the upper edge 41a of the slit 41 of the second component 21 are disposed on substantially the same straight line (see FIG. 3). The former is also the upper edge of the lower connecting portion 33 of the first component 11, and the latter is also the lower edge of the upper connecting portion 42 of the second component 21. Thus, as shown in FIG. 7, the upper edge of the lower connecting portion 33 of the first component 11 and the lower edge of the upper connecting portion 42 of the second component 21 come into contact with each other.

Subsequently, as a result of further progress of connecting work between the first component 11 and the second component 21, as shown in FIG. 6B, a distal end portion of the upper connecting portion 32 of the first component 11 comes into contact with a proximal end portion of the upper connecting portion 42 of the second component 21. Also, a distal end portion of the lower connecting portion 43 of the second component 21 comes into contact with a proximal end portion of the lower connecting portion 33 of the first component 11. As a result, connecting the first component 11 and the second component 21 is completed, thereby yielding the single bumper reinforce 10 composed of the two components 11 and 21 (see FIG. 1).

As a result of connection by such a connecting method, the connection S where the first component 11 and the second component 21 are connected has the following characteristic structure.

First, as shown in FIGS. 6B and 7, the first component 11 and the second component 21 overlap each other in such a manner as to be staggered in the depth direction on upper and lower sides of the slits 31 and 41. That is, the first component 11 and the second component 21 overlap each other from inside and from outside to thereby be staggered. More specifically, on the upper side of the slits 31 an 41, the upper web 24a of the second component 21 overlaps the upper web 14a of the first component 11 from inside, whereas, on the lower side of the slits 31 and 41, the lower web 24b of the second component 21 overlaps the lower web 14b of the first component 11 from outside.

Secondly, as shown in FIG. 7, the upper connecting portion 32 of the first component 11 and the upper connecting portion 42 of the second component 21 overlap each other in a surface contact manner, and the lower connecting portion 43 of the second component 21 and the lower connecting portion 33 of the first component 11 overlap each other in a surface contact manner. That is, the upper web 14a and the upper flange 15a of the upper connecting portion 32 of the first component 11 and the upper web 24a and the upper flange 25a of the upper connecting portion 42 of the second component 21 overlap each other in a surface contact manner. Also, the lower web 14b and the lower flange 16a of the lower connecting portion 33 of the first component 11 and the lower web 24b and the lower flange 26a of the lower connecting portion 43 of the second component 21 overlap each other in a surface contact manner. Such a configuration derives from the configuration in which the first component 11 and the second component 21 have the same plate thickness D2 and in which the portions to be inserted (the upper connecting portion 42 of the second component 21 and the lower connecting portion 33 of the first component 11) are retracted by a dimension equal to the plate thickness D2 (see FIG. 4).

Thirdly, as shown in FIGS. 6B and 7, the upper edge of the lower connecting portion 33 of the first component 11 (the lower edge 31a of the slit 31) and the lower edge of the upper connecting portion 42 of the second component 21 (the upper edge 41a of the slit 41) are in contact with each other. This is for the following reason: the lower edge 31a of the slit 31 of the first component 11 and the upper edge 41a of the slit 41 of the second component 21 are disposed on substantially the same straight line (see FIG. 3), and the former is also the upper edge of the lower connecting portion 33 of the first component 11, while the latter is also the lower edge of the upper connecting portion 42 of the second component 21.

Fourthly, as shown in FIG. 6B, the slit 31 of the first component 11 and the slit 41 of the second component 21 form a gap at the front of the connection S, and the gap has a dimension equal to a total (W1+W2) of the slit widths W1 and W2 of the two slits 31 and 41.

Fifthly, as shown in FIG. 7, the upper web 14a of the upper connecting portion 32 of the first component 11 and the lower web 24b of the lower connecting portion 43 of the second component 21 are flush with each other as well as with the webs 14 and 24 of the body portions 12 and 22.

As described above, the bumper reinforce 10 of the present embodiment is composed of the first component 11 and the second component 21, and the connection S between the two components 11 and 21 has the above-mentioned connecting structure. The bumper reinforce 10 having such a connecting structure yields the following excellent effects.

Figure 17A:
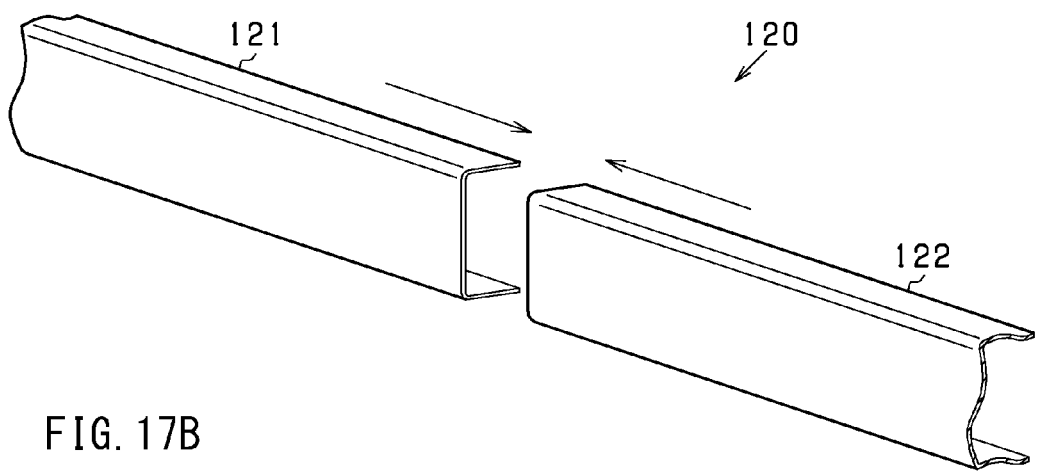
FIG. 17 is a set of perspective views showing a conventional connecting structure of the vehicle body component.
Figure 17B:
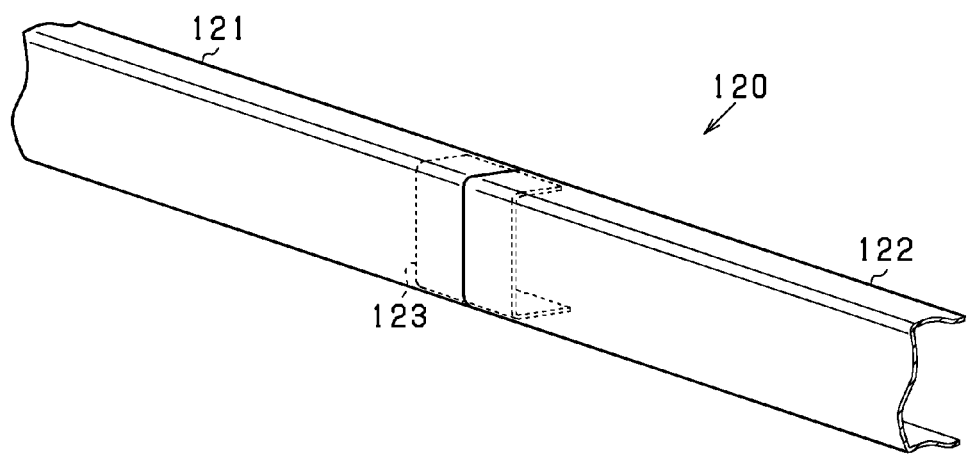

At the connection S between the first component 11 and the second component 21, one component overlaps the other component from inside and from outside in a staggered manner on the opposite sides of the slits 31 and 41 provided in the webs 14 and 24, respectively. Also, at the flanges 15, 16, 25, and 26, the first component 11 and the second component 21 overlap each other. Thus, at the connection S, the plate material is duplicated, whereby strength is secured. Therefore, in contrast to a conventional vehicle body component 120 shown in FIG. 17, there is no need to attach a reinforcing member 123 for securing strength. As a result, there can be suppressed an increase in the number of components for reinforcing strength and an addition of a step for attaching the reinforcing member 123.

Also, according to this configuration, in contrast to a conventional technique in which end surfaces merely butt against each other, and a configuration in which plate materials merely overlap each other, the structure of the connection S is stabilized, and a connected condition can be maintained unless force acts in such a direction as to separate the two components 11 and 21. Thus, welding, for example, for fixing the connected condition of the two components 11 and 21 is not mandatory, whereby an increase in manufacturing steps and an increase in manufacturing costs can be suppressed. Even if welding, for example, is to be performed on the connection S, a large-scale jig is unnecessary for holding a connected condition of the two components 11 and 21, because the connection S is stably held. Therefore, an increase in manufacturing steps and an increase in manufacturing costs can be suppressed.

The first component 11 and the second component 21 have the slits 31 and 41, respectively, formed along the longitudinal direction thereof and have the steps 34 and 44 provided between the opposite sides of the slits 31 and 41, respectively. Further, the steps 34 and 44 are opposite in direction to each other. Thus, through utilization of the slits 31 and 41 and the steps 34 and 44, the two components 11 and 21 can be connected while being moved along the juxtaposition direction thereof such that the slits 31 and 41 overlap each other, whereby the workability of the connecting work for the two components 11 and 21 improves.

The amounts of retraction of the lower connecting portion 33 of the first component 11 and the upper connecting portion 42 of the second component 21 are equal to the plate thickness D2. Thus, as shown in FIG. 7, at the connection S, surface contact is established between the upper connecting portions 32 and 42 of the two components 11 and 21 and between the lower connecting portions 33 and 43 of the two components 11 and 21. Accordingly, force imposed on the first component 11 can be surface-supported by the second component 21, whereby the degree of strength reinforcement can be improved.

The lower connecting portion 33 of the first component 11 and the upper connecting portion 42 of the second component 21 are formed by dividing the webs 14 and 24 by the slits 31 and 41, respectively, and retracting inward. Thus, they can be formed readily by performing press working and laser machining, for example.

The upper connecting portion 32 of the first component 11 and the lower connecting portion 43 of the second component 21 are extensions of the body portions 12 and 22, respectively, and overlap the inwardly retracted upper connecting portion 42 of the second component 21 and the inwardly retracted lower connecting portion 33 of the first component 11, respectively. Thus, the outside of the connection S is flush with the body portions 12 and 22, thereby suppressing the generation of irregularities at the connection S.

The slits 31 and 41 of the first component 11 and the second component 21 are provided at vertically central portions of the first component 11 and the second component 21, respectively, and have the same horizontal length and the same slit widths W1 and W2, and the dimensions D1 and D3 of the steps 34 and 44, respectively, are equal to each other. If the two components 11 and 21 are disposed at the vertically same position, the lower edge 31a of the slit 31 and the upper edge 41a of the slit 41 are disposed on substantially the same straight line. Thus, by reversing the first component 11, the first component 11 can become the second component 21, so that there is no need to manufacture the second component 21 separately from the first component 11, thereby contributing to a reduction in manufacturing costs.

The upper edge of the lower connecting portion 33 of the first component 11 (the lower edge 31a of the slit 31) and the lower edge of the upper connecting portion 42 of the second component 21 (the upper edge 41a of the slit 41) are in contact with each other, and in connecting the two components 11 and 21, the connecting work proceeds while these edges are in contact with each other. Thus, the contact functions as a guide in connecting the first component 11 and the second component 21 by moving them in their juxtaposition direction, thereby facilitating the connecting work. If fixation by welding is necessary, by welding the contact portion, the quality of welding can be stabilized.

Also, versatility can be imparted to the connecting portions 13 and 23 of the first component 11 and the second component 21 such that the connecting portions 13 and 23 allow manufacture of the bumper reinforces 10 having various longitudinal lengths rather than the connecting portions 13 and 23 being designed for individual cases of the bumper reinforces 10 having particular longitudinal lengths.

This will be described with reference to FIG. 8. FIG. 8 is a set of explanatory views showing that the bumper reinforces 10 having various lengths can be manufactured.

Figure 8A:
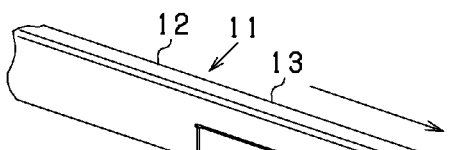
FIG. 8 is a set of explanatory views showing that bumper reinforces having various lengths can be manufactured.

As shown in FIG. 8A, there are prepared beforehand the first component 11 and the second component 21 whose connecting portions 13 and 23, respectively, have a relatively long longitudinal length. If the first component 11 and the second component 21 are connected as they are, as shown in FIG. 8B, there can be obtained the bumper reinforce 10 which has a relatively long overall length and whose connection S is relatively long.

Figure 8B:
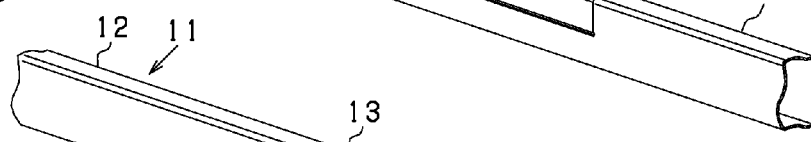
Figure 8C:
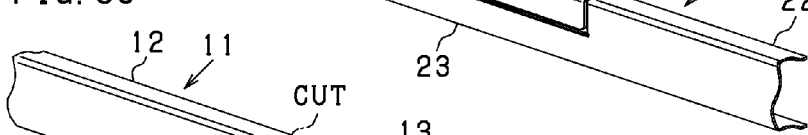
Figure 8D:
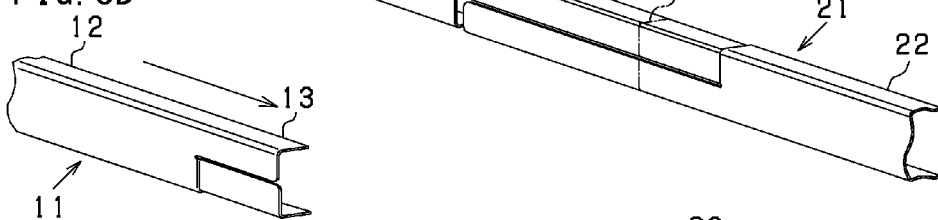
Figure 8E:
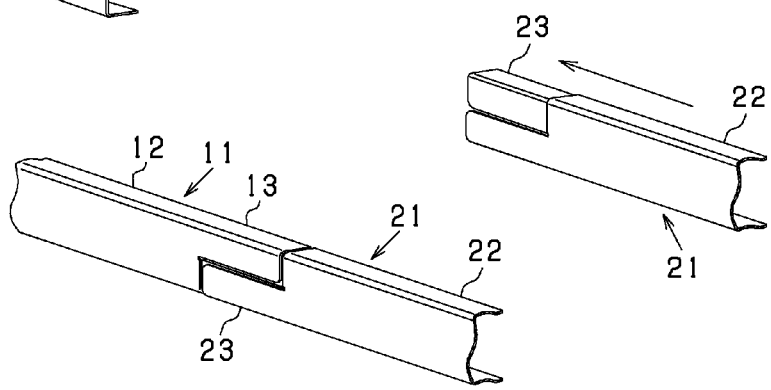

In manufacturing the bumper reinforce 10 shorter than that shown in FIG. 8B, the first component 11 and the second component 21 can also be utilized. In this case, as shown in FIGS. 8(c) and 8(d), the connecting portions 13 and 23 are cut along cutting lines CUT designed in accordance with the length of a desired bumper reinforce 10. After the cutting work, the first component 11 and the second component 21 are connected, whereby, as shown in FIG. 8(e), there can be obtained the bumper reinforce 10 having a shorter longitudinal length.

The bumper reinforce 10 is curved backward at opposite end portions or employs various structures at opposite end portions for connection to other frame components or the like. Thus, difficulty is encountered in adjusting length at the opposite end portions. In that regard, if length can be adjusted at the connecting portions 13 and 23, which are longitudinally central portions, length can be readily adjusted.

[Other Embodiments]

(1) In the above embodiment, the bumper reinforce 10 is longitudinally straight; however, the bumper reinforce 10 may be longitudinally curved. In this case, the first component 11 and the second component 21 have the same curvature.

(2) In the above embodiment, the bumper reinforce 10 is composed of the first component 11 and the second component 21, but may be composed of three or more components. In the above embodiment, the connection S is provided at a longitudinally central portion of the bumper reinforce 10; however, the connection S is not limited in position thereto, but may be provided at any position. As mentioned above, at the connection S, plate materials overlap each other in the depth direction to thereby reinforce strength; thus, the connection S may be provided at such a portion as to require reinforcement because of imposition of large load thereon.

(3) The above embodiment does not employ a structure for fixing the connected condition between the first component 11 and the second component 21; however, the connected condition may be fixed by welding or using screws, rivets, or the like. For example, at the connecting portions 13 and 23, the overlapping webs 14 and 24 and the overlapping flanges 15, 16, 25 and 26 may be fixed by use of screws, rivets, or the like, or the distal end portions of the connecting portions 13 and 23, and the slits 31 and 41 may be welded.

Figure 9A:
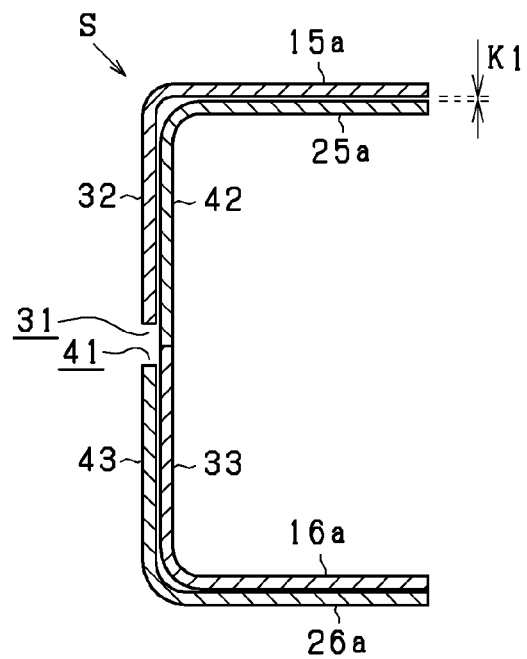
FIG. 9 is a set of sectional views showing other examples of a connection.

(4) In the above embodiment, the lower connecting portion 33 of the first component 11 and the upper connecting portion 42 of the second component 21 are retracted by the plate thickness D2; however, the connecting portions 33 and 42 may be retracted by more than the plate thickness D2. As a result, as shown in FIG. 9A, a clearance K1 is formed between the upper connecting portion 32 of the first component 11 and the upper connecting portion 42 of the second component 21 and between the lower connecting portion 33 of the first component 11 and the lower connecting portion 43 of the second component 21. The clearance K1 can absorb accuracy variations which arise in manufacturing the first component 11 and the second component 21. Accordingly, the portions do not require highly accurate working, whereby manufacturing costs can be reduced.

(5) The structures of the slits 31 and 41 of the first component 11 and the second component 21 may be modified. For example, in the present embodiment, the slit widths W1 and W2 of the slits 31 and 41, respectively, have the same value, but may have different values. The slit widths W1 and W2 may be zero so long as the slits 31 and 41 vertically divide the connecting portions 13 and 23, respectively, and the steps 34 and 44 are provided.

Figure 9B:
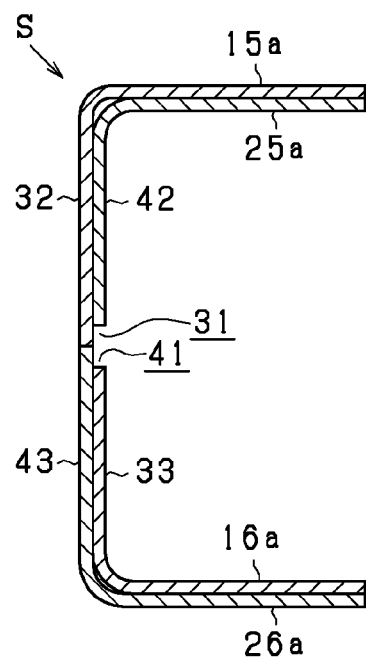

Referring back to FIG. 3, in the first component 11, the length L2 may be shorter than substantially half of the vertical width L1 of the body portion 12, and the length L3 may be equal to half of the vertical length L1 of the body portion 12. In this case, in the second component 21, the length L4 is shorter than half of the vertical width L1 of the body portion 22, and the length L5 is equal to half of the vertical width L1 of the body portion 22. In the case of employment of such a structure, at the connection S of the bumper reinforce 10, as shown in FIG. 9B, a gap formed by the slits 31 and 41 is reverse in the depth direction to that of the present embodiment; i.e., the gap is formed inside.

Figure 9C:
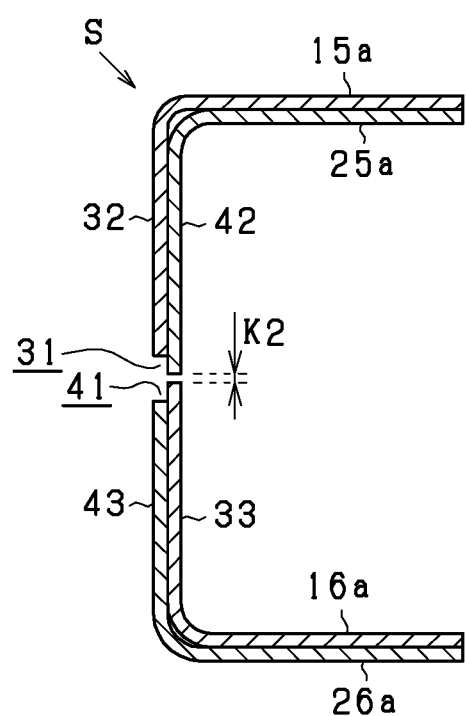

Further, in the first component 11, the length L2 may be shorter than half of the vertical width L1 of the body portion 12 while the length L3 is equal to that of the above embodiment. In this case, in the second component 21, the length L4 becomes shorter than half of the vertical width L1 of the body portion 22 while the length L5 is equal to that of the above embodiment. In the case of employment of such a structure, as shown in FIG. 9(c), a clearance K2 is formed between the upper edge of the lower connecting portion 33 (the lower edge 31a of the slit 31) of the first component 11 and the lower edge of the upper connecting portion 42 (the upper edge 41a of the slit 41) of the second component 21. The clearance K2 can absorb accuracy variations which arise in manufacturing the first component 11 and the second component 21. Accordingly, the portions do not require highly accurate working, whereby manufacturing costs can be reduced.

Figure 10A:
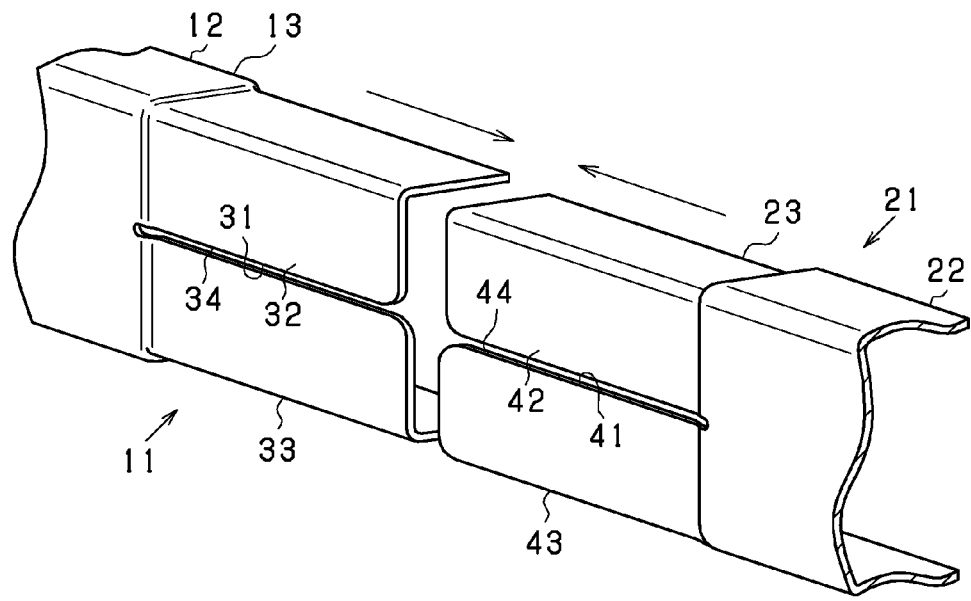
FIG. 10 is a set of perspective views showing another example of the connection.
Figure 10B:
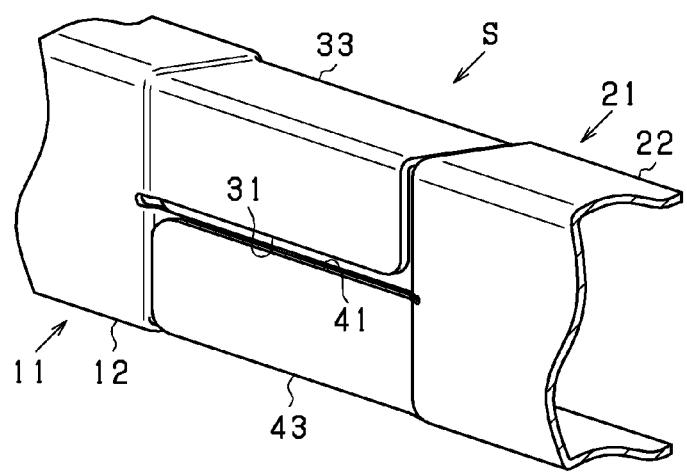

(6) In the above embodiment, the upper connecting portion 32 of the first component 11 and the lower connecting portion 43 of the second component 21 are configured such that their webs 14a and 24b and their flanges 15a and 26a are flush with those of the body portions 12 and 22, respectively. In place of this, as shown in FIG. 10A, the upper connecting portion 32 of the first component 11 and the lower connecting portion 43 of the second component 21 may be retracted inward. Even in this structure, the steps 34 and 44 are formed between the upper connecting portion 32 and the lower connecting portion 33 of the first component 11 and between the upper connecting portion 42 and the lower connecting portion 43 of the second component 21. Thus, the lower connecting portion 33 of the first component 11 and the upper connecting portion 42 of the second component 21 are retracted more inward than those of the above embodiment. Through employment of such a structure, as shown in FIG. 10B, the connection S of the bumper reinforce 10 can be retracted more inward; i.e., depressed more, in relation to the other portions.

(7) In the above embodiment, the steps 34 and 44 are provided between the opposite sides of the slits 31 and 41 of the first component 11 and the second component 21, respectively; however, the steps 34 and 44 are not mandatory and may be eliminated.

(8) In the above embodiment, the first component 11 and the second component 21 are vertically divided; however, one of the slits 31 and 41 may be provided in the relevant component to divide the relevant component only. In this case, by connecting the components in such a manner as to insert the connecting portion of one component into the slit formed in the other component, the one component overlaps the other component from inside and from outside in a staggered manner.

Further, in place of halving as in the case of the above embodiment, a plurality of the slits 31 and 41 may be formed for division into three or more divisions. For common use of the first component 11 and the second component 21, division into an even number of divisions is preferred. FIG. 11 shows an example of dividing the connecting portions 13 and 23 into four divisions by the three slits 31 and 41.

Figure 11A:
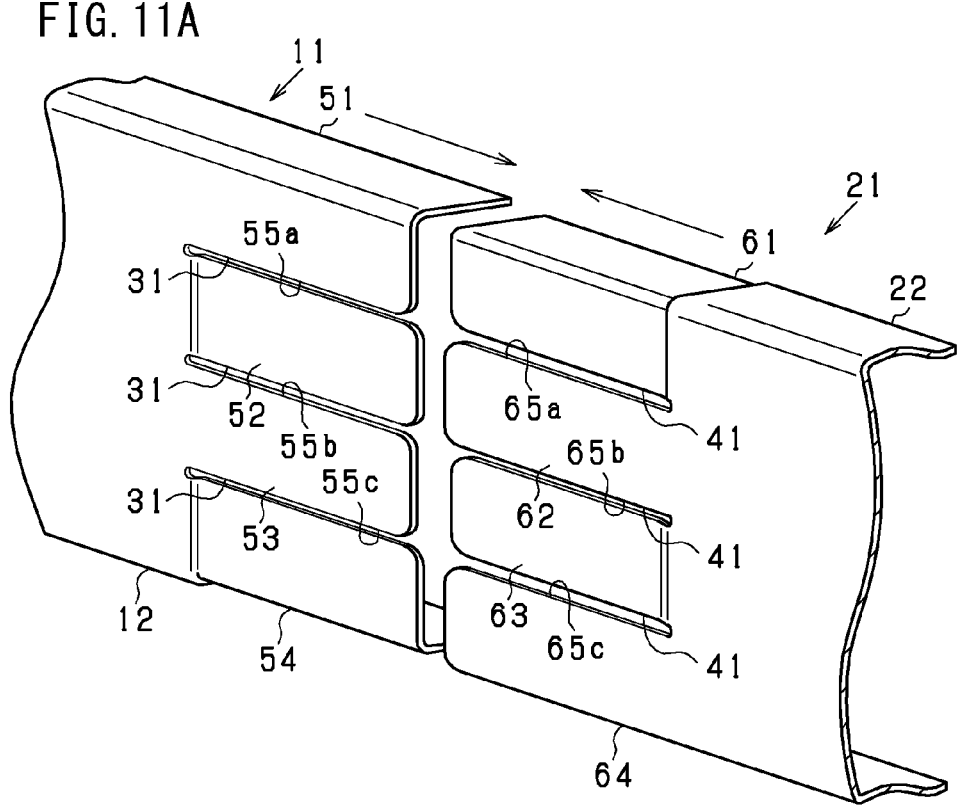
FIG. 11 is a set of perspective views showing a further example of the connection.

As shown in FIG. 11A, of divisions 51 to 54 of the first component 11, the first division 51 located at the upper end corresponds to the upper connecting portion 32 in the above embodiment, and the fourth division 54 located at the lower end corresponds to the lower connecting portion 33 in the above embodiment. Each of the first division 51 and the fourth division 54 has a sectional shape resembling the letter L, and the fourth division 54 is retracted inward. The second division 52 and the third division 53 have a plate shape, and the second division 52 is retracted inward in relation to the first division 51 and the third division 53. As a result, steps 55a to 55c are formed between the divisions 51 to 54. In this case, the second division 52 corresponds to the second flat plate portion, and the third division 53 corresponds to the first flat plate portion.

Meanwhile, of divisions 61 to 64 of the second component 21, the first division 61 located at the upper end corresponds to the upper connecting portion 42 in the above embodiment, and the fourth division 64 located at the lower end corresponds to the lower connecting portion 43 in the above embodiment. Each of the first division 61 and the fourth division 64 has a sectional shape resembling the letter L, and the first division 61 is retracted inward. The second division 62 and the third division 63 have a plate shape, and the third division 63 is retracted inward in relation to the second division 62 and the fourth division 64. As a result, steps 65a to 65c are formed between the divisions 61 to 64. In this case, the second division 62 corresponds to the first flat plate portion, and the third division 63 corresponds to the second flat plate portion.

In such a structure, the first division 61 of the second component 21 is caused to overlap the first division 51 of the first component 11 from inside, and the second division 62 of the second component 21 is caused to overlap the second division 52 of the first component 11 from outside. Further, the third division 63 of the second component 21 is caused to overlap the third division 53 of the first component 11 from inside, and the fourth division 64 of the second component 21 is caused to overlap the fourth division 54 of the first component 11 from outside. In this manner, the two components 11 and 21 are connected.

Figure 11B:
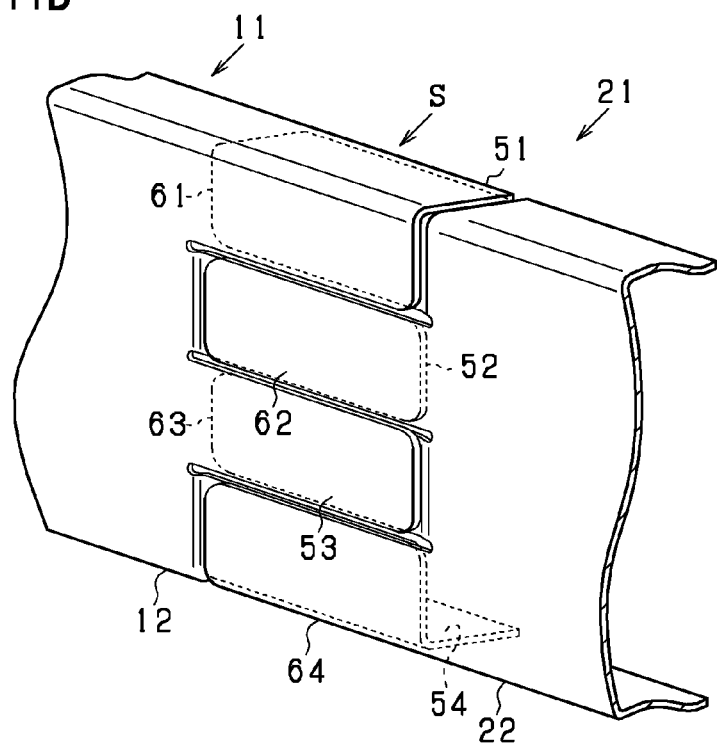

As a result, as shown in FIG. 11B, at the connection S between the first component 11 and the second component 21, the first division 51 to the fourth division 54 and the first division 61 to the fourth division 64 overlap one another in a staggered manner. Thus, effects similar to those of the above embodiment can be yielded.

(9) In the above embodiment, the first component 11 and the second component 21 each having a U-shaped cross section are connected to thereby form the single elongated bumper reinforce 10. A plurality of such elongated combination components each being formed by connecting a plurality of components may be combined together so as to form a single bumper reinforce. For example, FIG. 12 shows an example of configuring a single bumper reinforce 70 by combining two elongated members, wherein FIG. 12A is an exploded perspective view, and FIG. 12B is a perspective view showing the overall bumper reinforce 70.

Figure 12A:
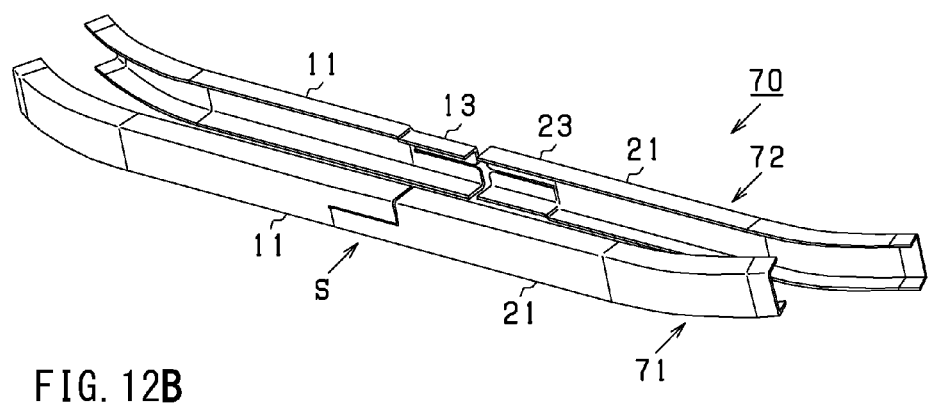
FIG. 12 is a set of perspective views showing another example of a vehicle body component.

As shown in FIG. 12A, the bumper reinforce 70 is composed of two combination components 71 and 72. Each of the combination components 71 and 72 is formed by connecting the first component 11 and the second component 21. One (in the drawing, the second combination component 72) of the two combination components 71 and 72 is smaller in vertical dimension than the other (in the drawing, the first combination component 71). The two combination components 71 and 72 are combined together as follows: with the inner sides (the open sides of the letters U) of the two combination components 71 and 72 facing each other, the small-size combination component (in the drawing, the second combination component 72) is inserted into the other combination component (the first combination component 71). In this combined state, the flanges of the two combination components 71 and 72 overlap each other in a surface contact manner. The two combination components 71 and 72 are fixed by an appropriate method such as welding or screwing.

Figure 12B:
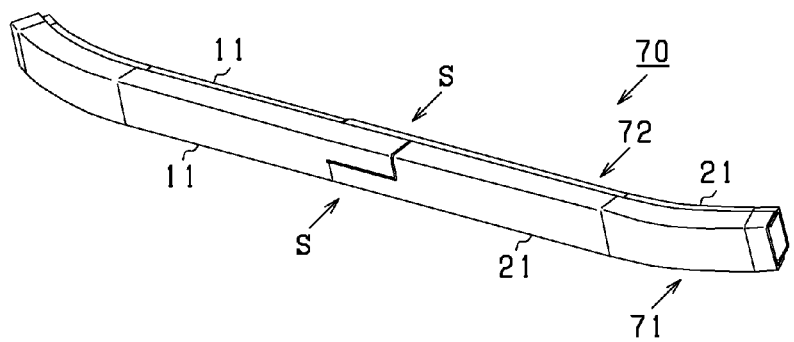

As a result, as shown in FIG. 12B, a single bumper reinforce 70 having a substantially rectangular cross section is formed. As compared with the case where the combination components 71 and 72 are used individually as in the case of the above embodiment, the bumper reinforce 70 having such a structure can provide improved strength.

(10) In the above embodiment, the connecting structure of the present invention is applied to the bumper reinforce 10, which is a frame component, but may be applied to vehicle body components such as other frame components and reinforcing components. Examples of other applications include a front underrun protector, a cross member, a floor reinforce, a door impact beam, a belt line reinforce, a roof reinforce, and a side sill.

FIGS. 13 to 16 show examples of such applications. As shown in the drawings, each of the vehicle body components has the connection S between two components at a longitudinally central portion thereof.

Figure 13A:
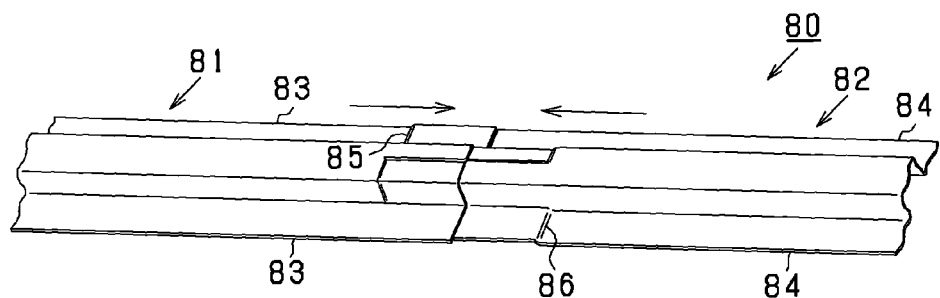
FIG. 13 is a set of perspective views showing a further example of the vehicle body component.
Figure 13B:
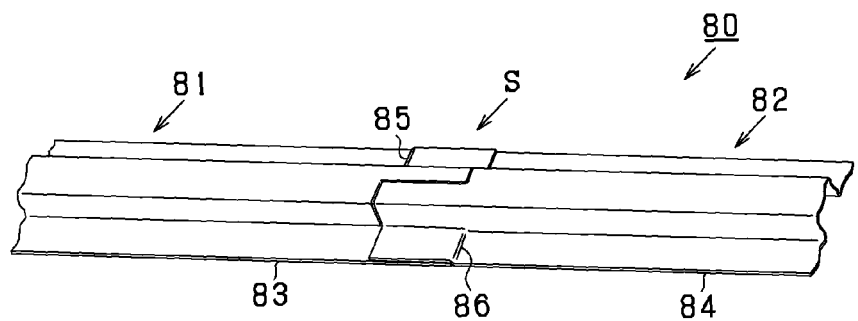

FIG. 13 is a set of views showing an example of application to a cross member 80, wherein FIG. 13A and FIG. 13B show states before and after connection. A floor reinforce is also configured similarly. In this configuration, a first component 81 and a second component 82 do not have a substantially U-shaped cross section, but has additional flanges 83 and 84, respectively. The flanges 83 and 84 have steps 85 and 86, respectively, and, when the two components 81 and 82 are connected, the flanges 83 and 84 vertically overlap each other.

Figure 14A:
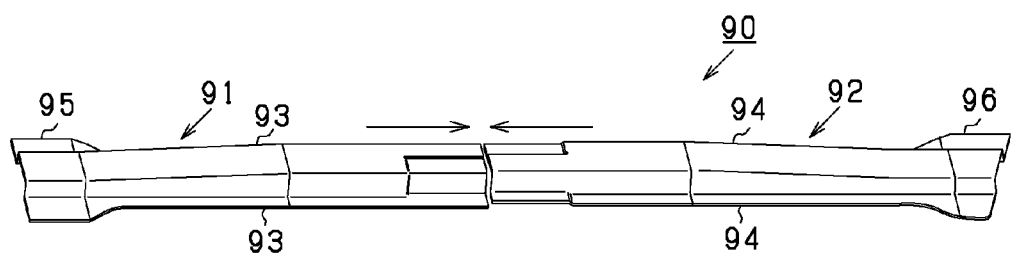
FIG. 14 is a set of perspective views showing a still further example of the vehicle body component.
Figure 14B:
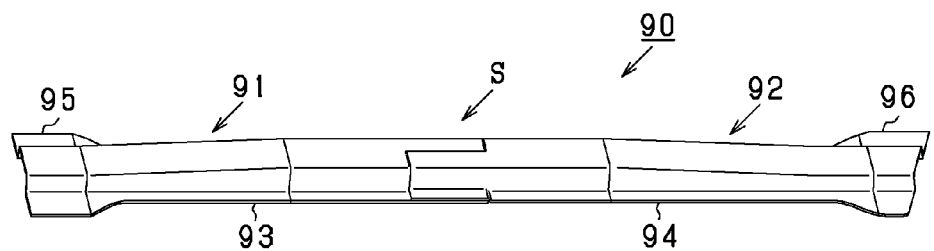

FIG. 14 is a set of views showing an example of application to a door impact beam 90, wherein FIG. 14A and FIG. 14B show states before and after connection. A belt line reinforce is also configured similarly. In this configuration, similar to the cross member 80 of FIG. 13, a first component 91 and a second component 92 have flanges 93 and 94, respectively, and, at the connection S, the flanges 93 and 94 vertically overlap each other. Also, the door impact beam 90 has welding flanges 95 and 96 at respective opposite end portions thereof for connection to other members.

Figure 15A:
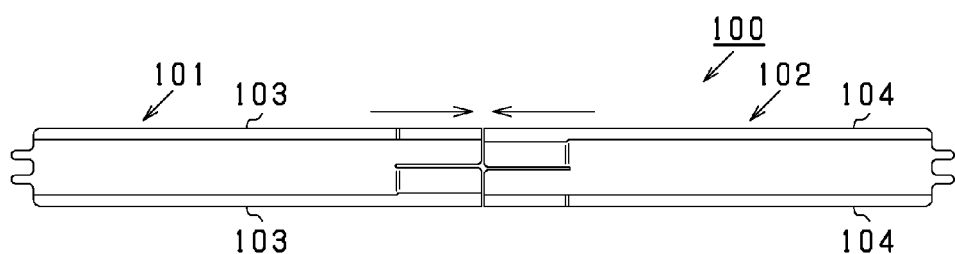
FIG. 15 is a set of plan views showing yet another example of the vehicle body component.
Figure 15B:
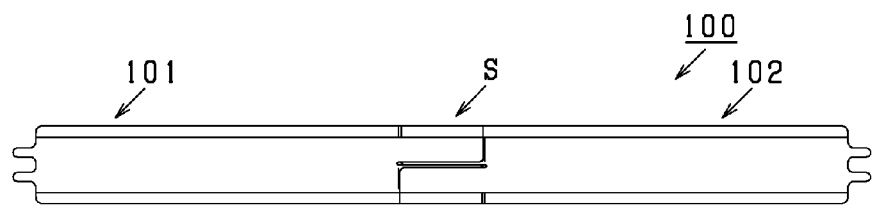

FIG. 15 is a set of views showing an example of application to a roof reinforce 100, wherein FIG. 15A and FIG. 15B show states before and after connection. In this configuration also, similar to the cross member 80 of FIG. 13 and the door impact beam 90 of FIG. 14, a first component 101 and a second component 102 have flanges 103 and 104, respectively, and, at the connection S, the flanges 103 and 104 vertically overlap each other.

Figure 16A:
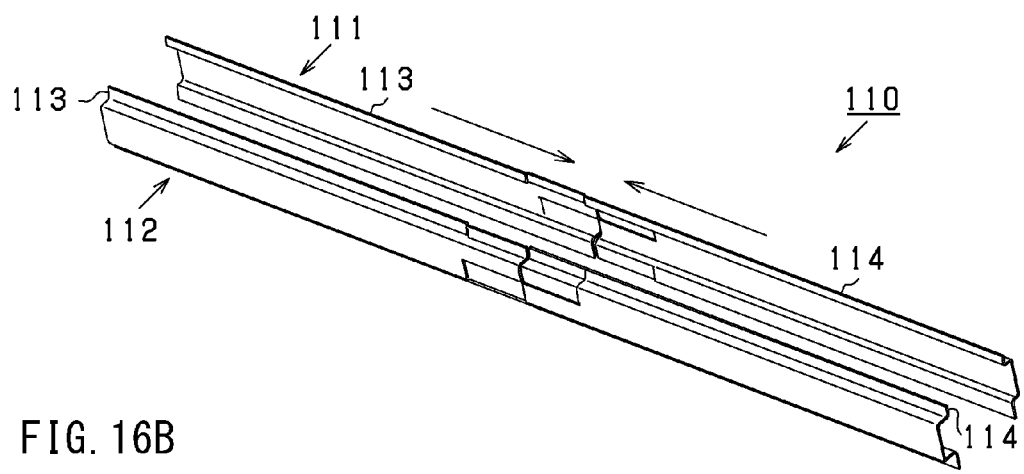
FIG. 16 is a set of perspective views showing another example of the vehicle body component.
Figure 16B:
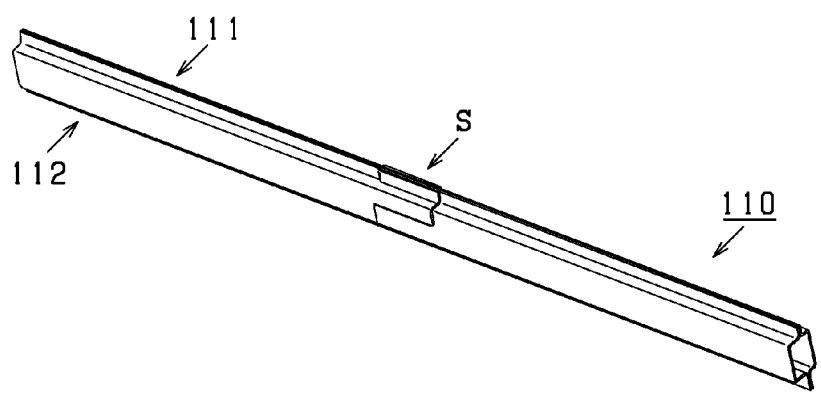

FIG. 16 is a set of views showing an example of application to a side sill 110, wherein FIG. 16A and FIG. 16B show states before and after connection. Similar to the bumper reinforce 70 shown in FIG. 12, the side sill 110 is composed of two combination components 111 and 112. As in the case of the roof reinforce 100 of FIG. 15, the combination components 111 and 112 have flanges 113 and 114, respectively. The two combination components 111 and 112 are combined together in such a manner that the flanges 113 and 114 overlap each other. The two combination components 111 and 112 are fixed by an appropriate method such as welding or screwing.

(11) In the above embodiment, the first component 11 and the second component 21 are designed for common use; however, the two components 11 and 21 may not be designed for common use by imparting different structures to the body portions 12 and 22 of the first component 11 and the second component 21, respectively. For example, if the body portions 12 and 22 of the first component 11 and the second component 21, respectively, differ in structure, the two components 11 and 21 cannot be used in common. Even in this case, if the connecting portions 13 and 23 employ the respective structures of the above embodiment, the connection S has a connecting structure similar to that of the above embodiment.

Notably, in the case where the body portions 12 and 22 of the two components 11 and 21, respectively, have a common structure, and the slits 31 and 41 of the connecting portions 13 and 23, respectively, are provided at a vertically central portion, the reversed first component 11 can be utilized as the second component 21.

(12) In the above embodiment, the first component 11 and the second component 21 are formed of a channel steel having a U-shaped cross section; however, no particular limitation is imposed on the cross-sectional shape so long as the shape is bilaterally symmetrical. For example, the components 11 and 21 may be of a flat plate or may have a polygonal cross section, such as a trapezoidal or triangular cross section, or a non-polygonal cross section, such as a semicircular or corrugated cross section. The cross-sectional shape may be a range of, for example, substantially U-shaped cross sections as in the case of the corrugated plate.

(13) In the above embodiment, the bumper reinforce 10 is formed of steel; however, no particular limitation is imposed on material therefor. For example, a nonferrous metal such as aluminum, a resin material, a fiber material such as carbon fiber or glass fiber, or a composite material thereof may be used.

DESCRIPTION OF REFERENCE NUMERALS

10: bumper reinforce (vehicle body component); 11: first component; 14: web (bottom plate portion); 15, 16, 25, 26: flange (side plate portion); 14a: upper web (first flat plate portion); 14b: lower web (second flat plate portion); 21: second component; 24a: upper web (second flat plate portion); 24b: lower web (first flat plate portion); 31, 41: slit; 34, 44: step; and D2: plate thickness.

The invention claimed is:

1. A vehicle body component comprising:
   a first component and a second component which are formed of a plate material, and configured to extend in a juxtaposition direction in which the components are arranged, by connecting end portions of the components, wherein
      the connection-side end portion of the first component has a slit which opens at its end;
      in the one side across the slit, the connection-side end portion of the first component overlaps the connection-side end portion of the second component on the outside of the connection-side end portion of the second component; and
      in the other side across the slit, the connection-side end portion of the first component overlaps the connection-side end portion of the second component on the inside of the connection-side end portion of the second component.

2. A vehicle body component according to claim 1, wherein one side of the opposite sides across the slit is retracted inward in the connection-side end portion of the first component and a step is provided between the one side and the other side across the slit.

3. A vehicle body component according to claim 1, wherein the slit extends in the juxtaposition direction.

4. A vehicle body component according to claim 3, wherein the connection-side end portion of the second component has a slit which opens at its end and extends along the juxtaposition direction; the slit overlaps the slit of the first component; and the side which is retracted inward is the opposite to the first component and a step is provided between the side and the other side across the slit of the second component.

5. A vehicle body component according to claim 4, wherein the first component and the second component have the same plate thickness, and the dimension of the steps are substantially equal to the plate thickness.

6. A vehicle body component according to claim 4, wherein the slits provided in the first component and the second component are provided at respective central portions with respect to a direction substantially orthogonal to the juxtaposition direction.

7. A vehicle body component according to claim 4, wherein in each of the connection-side end portions of the first component and the second component,
   one of the plate portions located on the opposite sides across the slit is a first flat plate portion flush with a plate portion, and the other plate portion is a second flat plate portion which forms the step in cooperation with the first flat plate portion as a result of subjection to bending while being held in parallel with the first flat plate portion.

8. A vehicle body component according to claim 7, wherein the second flat plate portion of the first component and the second flat plate portion of the second component are in contact with each other at their edges.

9. A vehicle body component according to claim 7, wherein
   each of the first component and the second component has a channel-shaped cross section and has a bottom plate portion along a direction substantially orthogonal to the juxtaposition direction and a pair of side plate portions extending sideward from opposite ends in the substantially orthogonal direction of the bottom plate portion;
   in each of the connection-side end portions of the first component and the second component, the slit, the first flat plate portion, and the second flat plate portion are provided at the bottom plate portion; and
   of a pair of the side plate portions, the side plate portion connected to the second flat plate portion is subjected to bending in such a manner as to be disposed at a position shifted toward the other side plate portion.

* * * * *